(12) United States Patent
Makhija et al.

(10) Patent No.: US 11,537,548 B2
(45) Date of Patent: Dec. 27, 2022

(54) BANDWIDTH ALLOCATION IN ASYMMETRICAL SWITCH TOPOLOGIES

(71) Applicant: Google LLC, Mountain View, CA (US)

(72) Inventors: Pankaj Makhija, South San Francisco, CA (US); Nishant Patil, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 203 days.

(21) Appl. No.: 16/393,425

(22) Filed: Apr. 24, 2019

(65) Prior Publication Data

US 2020/0341931 A1 Oct. 29, 2020

(51) Int. Cl.
*G06F 13/42* (2006.01)
*H04L 49/253* (2022.01)
*H04L 49/00* (2022.01)

(52) U.S. Cl.
CPC ........ *G06F 13/4226* (2013.01); *H04L 49/253* (2013.01); *H04L 49/70* (2013.01); *G06F 2213/0026* (2013.01)

(58) Field of Classification Search
CPC .... G06F 13/4226; H04L 49/253; H04L 49/70
USPC ........................................................ 710/105
See application file for complete search history.

(56) References Cited

U.S. PATENT DOCUMENTS

| | | | |
|---|---|---|---|
| 7,356,636 B2 | 8/2008 | Torudbakken et al. | |
| 7,610,431 B1 * | 10/2009 | Watkins | G06F 13/4022 710/100 |
| 7,979,592 B1 * | 7/2011 | Pettey | G06F 13/404 709/205 |
| 8,503,468 B2 | 8/2013 | Akyol et al. | |
| 8,601,199 B2 | 12/2013 | Tolliver | |
| 8,756,360 B1 * | 6/2014 | Richard | G06F 13/4022 710/316 |
| 9,479,457 B2 | 10/2016 | Sindhu | |
| 10,394,747 B1 * | 8/2019 | Paneah | G06F 13/4282 |
| 10,521,376 B1 * | 12/2019 | Mitra | G06F 3/0653 |

(Continued)

FOREIGN PATENT DOCUMENTS

| | | |
|---|---|---|
| WO | WO 2013/184141 | 12/2013 |
| WO | WO 2017/020799 | 2/2017 |

OTHER PUBLICATIONS

Evanczuk, "PCIe Gen3 Switches Boost Throughout Option," EETimes, Aug. 2012, 2 pages.

(Continued)

*Primary Examiner* — Paul R. Myers
(74) *Attorney, Agent, or Firm* — Fish & Richardson P.C.

(57) ABSTRACT

Methods and systems for facilitating an equitable bandwidth distribution across downstream devices in asymmetrical switch topologies, and in particular asymmetrical PCIe switch topologies. The equitable distribution of bandwidth is achieved in asymmetrical topologies using virtual switch partitioning. An upstream switch that is connected to the root complex via an upstream port and that receives bandwidth B from the upstream port, is virtualized into two or more virtual switches. Each virtual switch equally shares the bandwidth. Each virtual switch is allocated to downstream devices that are connected to the upstream switch as well as to one or more downstream switches that are connected to the upstream switch. Each downstream switch may be connected to one or more additional downstream devices.

14 Claims, 3 Drawing Sheets

(56) References Cited

U.S. PATENT DOCUMENTS

| | | | | |
|---|---|---|---|---|
| 2006/0239287 | A1* | 10/2006 | Johnsen | H04L 12/4625 370/412 |
| 2006/0242330 | A1* | 10/2006 | Torudbakken | G06F 13/4004 710/5 |
| 2006/0242353 | A1* | 10/2006 | Torudbakken | G06F 13/4022 710/316 |
| 2007/0088873 | A1* | 4/2007 | Oshikiri | G06F 13/4278 710/58 |
| 2007/0150762 | A1 | 6/2007 | Sharma et al. | |
| 2008/0263246 | A1 | 10/2008 | Larson et al. | |
| 2009/0089464 | A1* | 4/2009 | Lach | G06F 13/4022 710/62 |
| 2009/0094399 | A1* | 4/2009 | Daniel | G06F 13/4022 710/311 |
| 2010/0115174 | A1* | 5/2010 | Akyol | G06F 13/385 710/316 |
| 2012/0005392 | A1* | 1/2012 | Yagi | G06F 13/409 710/313 |
| 2012/0131201 | A1* | 5/2012 | Matthews | G06F 13/4081 709/226 |
| 2012/0284712 | A1 | 11/2012 | Nimmagadda et al. | |
| 2014/0040527 | A1* | 2/2014 | Kanigicherla | G06F 13/40 710/316 |
| 2014/0237156 | A1* | 8/2014 | Regula | G06F 13/4027 710/314 |
| 2015/0026384 | A1* | 1/2015 | Maitra | G06F 13/4022 710/313 |
| 2015/0052282 | A1* | 2/2015 | Dong | H04L 49/70 710/308 |
| 2016/0098372 | A1 | 4/2016 | Boyle et al. | |
| 2016/0283428 | A1* | 9/2016 | Guddeti | G06F 13/4027 |
| 2017/0177528 | A1* | 6/2017 | Harriman | G06F 13/4282 |
| 2017/0329735 | A1* | 11/2017 | Garg | G06F 13/4022 |
| 2018/0314666 | A1* | 11/2018 | Tanaka | G06F 13/1668 |
| 2019/0334990 | A1* | 10/2019 | Enz | H04L 49/555 |
| 2020/0143506 | A1* | 5/2020 | Xu | G06F 13/4221 |

OTHER PUBLICATIONS

PCT International Search Report and Written Opinion in International Application No. PCT/US2019/061359, dated Feb. 11, 2020, 13 pages.

International Preliminary Report on Patentability in International Application No. PCT/US2019/061359, dated Nov. 4, 2021, 8 pages.

* cited by examiner

BANDWIDTH ALLOCATION IN ASYMMETRICAL SWITCH TOPOLOGIES

BACKGROUND

Systems with asymmetrical switch topologies generally result from constraints in the system design. For example, systems have asymmetric Peripheral Component Interconnect Express (PCIe) switch topologies resulting from design constraints such as limited PCIe links, space constraints for additional switches to support a balanced PCIe tree, or physical constraints causing limited upstream ports to the root complex.

Systems with asymmetrical switch topologies have unbalanced bandwidth across downstream devices. This is because some downstream devices are connected to a downstream switch, which is connected to an upstream switch to which other downstream devices are also connected. Because traffic is balanced across the ports of the upstream switch, the connection to the downstream switch from the upstream switch has the same bandwidth allocation as the connections to the downstream devices on the upstream switch. As a result, the downstream devices connected to the downstream switch receive lower bandwidth in comparison to the downstream devices connected to the upstream switch.

SUMMARY

In general, one innovative aspect of the subject matter described in this specification can be embodied in a system including an upstream switch connected to a root complex through a first upstream port that has a bandwidth B, wherein the upstream switch is virtualized into n virtual switches, wherein each of the n virtual switches receives B/n bandwidth from the first upstream port; for a first virtual switch of the n virtual switches, the first virtual switch is connected to a first plurality of downstream devices through a first plurality of downstream ports in the upstream switch; for each remaining virtual switch of the n virtual switches, the virtual switch is connected to a respective second upstream port of a respective downstream switch, wherein the respective second upstream port of the respective downstream switch is connected to the upstream switch through a respective downstream port in the upstream switch; and for each respective downstream switch, the downstream switch is connected to a respective second plurality of downstream devices through a respective second plurality of downstream ports in the respective second switch. Other embodiments of this aspect include corresponding methods, devices, apparatus, and computer programs configured to perform the aspects of the system. The computer programs (e.g., instructions) can be encoded on computer storage devices. These and other embodiments can each optionally include one or more of the following features.

In some implementations, the systems can include two virtual switches, and each of the two virtual switches can include the same number of downstream ports.

In some implementations, the first plurality of downstream devices comprises m devices and the respective second plurality of downstream devices comprises p devices, where m is not equal to p. Each of the m devices receives $B/(n*m)$ bandwidth; and each of the p devices receives $B/(n*p)$ bandwidth.

In some implementations, each of the first upstream port, the first plurality of downstream ports, and the respective second plurality of downstream ports has the same number of lanes.

In some implementations, each switch is a PCIe switch.

Particular embodiments of the subject matter described in this specification can be implemented to realize a more equitable and more balanced bandwidth performance across the downstream devices in a system with an asymmetrical switch topology than asymmetrical switch topologies that do not implement the subject matter.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to systems and methods that facilitate an equitable bandwidth distribution across downstream devices in asymmetrical switch topologies, and in particular asymmetrical PCIe switch topologies. The equitable distribution of bandwidth results in bandwidth allocations that may be balanced, or that may minimize bandwidth imbalances that would occur in the absence of the novel features described below.

Systems with an asymmetrical switch topology have unbalanced bandwidth across downstream devices. As used in this specification, a "downstream device" may be an endpoint to which traffic is sent, or a switching device if there is a hierarchy of switches. Example downstream devices include peripheral devices, which may include storage devices, GPUs, sound cards, among others. The unbalanced bandwidth is because some downstream devices are connected to a downstream switch, which is connected to an upstream switch to which other downstream devices are also connected. Because traffic is balanced across ports of the upstream switch, the connection to the downstream switch from the upstream switch has the same bandwidth allocation as the connections to the downstream devices on the upstream switch. As a result, the downstream devices connected to the downstream switch receive lower bandwidth in comparison to the downstream devices connected to the upstream switch.

Figure 1:
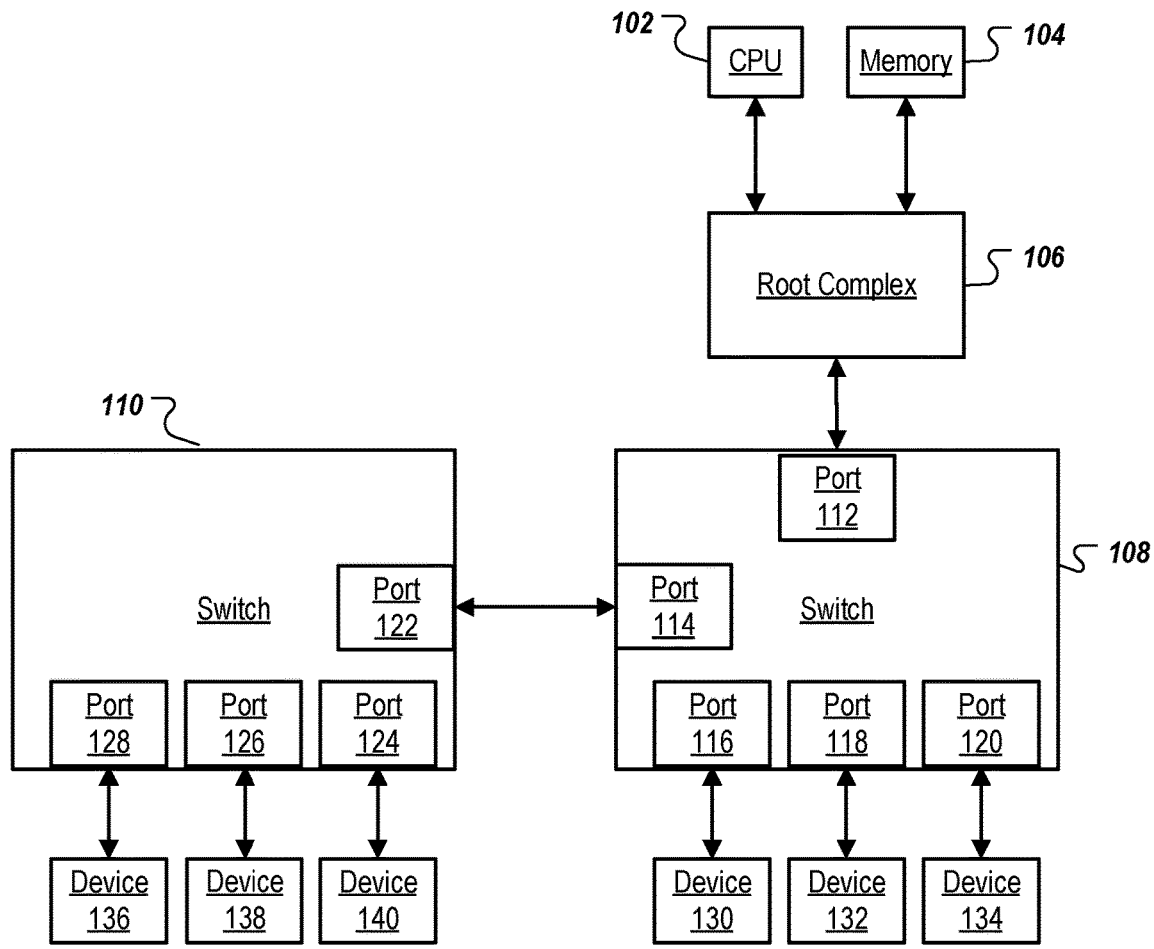
FIG. 1 is a block diagram of a prior art asymmetrical switch topology.

This bandwidth imbalance between downstream devices connected to an upstream switch and a downstream switch is illustrated using a prior art asymmetrical switch topology shown in FIG. 1. The switch topology shown in FIG. 1 includes two PCIe switches: an upstream switch 108 and a downstream switch 110.

The upstream switch 108, through its upstream port 112, connects to a root complex 106. The root complex 106 is connected to a CPU 102 and memory 104. The upstream switch 108, through its upstream port 112, receives traffic at a bandwidth B from the root complex 106.

The upstream switch 108 includes four downstream ports: port 114, port 116, port 118, and port 120. Three of the ports are connected to downstream devices, while the fourth port is connected to a downstream switch 110. Specifically, downstream ports 116, 118, and 120 are connected to devices 130, 132, and 134, respectively. Downstream port 114 is connected to the upstream port 122 of the downstream switch 110.

The downstream switch 110 includes three downstream ports: port 128, port 126, and port 124. Port 128, port 126, and port 124 are connected to downstream devices 136, 138, and 140, respectively.

In FIG. 1, each port in the upstream and downstream switches includes 16 lanes. However, each port may also include a different number (e.g., 1, 4, or 8) of lanes.

Traffic is balanced across all downstream ports of the upstream switch 108. As a result, each of the downstream devices 130, 132, and 134, connected to downstream port 116, 118, and 120, respectively, receives ¼ of the total bandwidth B. Similarly, the downstream switch 110, which is connected to the downstream port 114, also receives ¼ of the total bandwidth B.

Traffic is also balanced across all downstream ports in the downstream switch 110. As a result, each downstream device connected to the downstream switch equally shares the ¼ of the total bandwidth received by the downstream switch. Thus, each of the three downstream devices 136, 138, and 140, connected to downstream port 128, 126, and 124, respectively, of the downstream switch 110, receive 1/12th (i.e., (⅓)*(¼)) of the total bandwidth B. As a result, the total bandwidth available for each downstream device 136, 138, and 140 connected to the downstream switch is (⅓)*(¼), or 1/12 of the total bandwidth B.

Therefore, in the asymmetrical topology shown in FIG. 1, each downstream devices connected to the upstream switch 108 receive three times as much bandwidth in comparison to the downstream devices connected to the downstream switch 110.

To address this imbalance, the bandwidth traffic in asymmetrical switch topologies can be more equitably distributed using virtual switch partitioning. Specifically, an upstream switch that is connected to the root complex via an upstream port and that receives bandwidth traffic B from the upstream port, may be virtualized into n switches (where n may be two or more virtual switches), and each virtual switch equally shares the same bandwidth by having a proportional allocation. In other words, each of the n virtual switches is allocated B/n bandwidth. One virtual switch in the upstream device is allocated to downstream devices that are connected to the upstream switch, and the remaining virtual switches (one or more) are allocated to respective downstream switches that are connected to the upstream switch.

Figure 2:
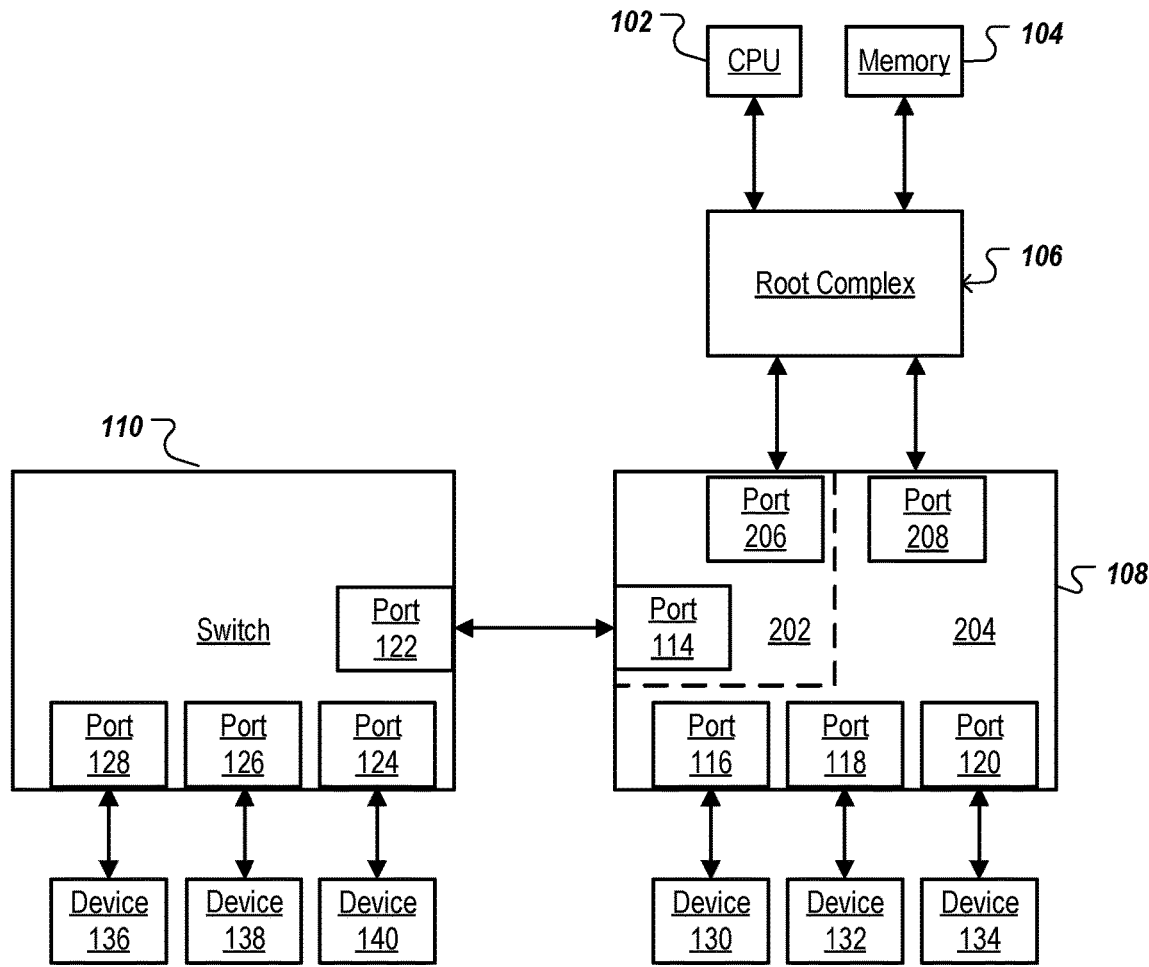
FIG. 2 is a block diagram of an example asymmetrical switch topology using virtual switch partitioning.

FIG. 2 is a block diagram of an example asymmetrical switch topology using virtual switch partitioning. FIG. 2 has the same two-switch topology shown in FIG. 1, with the exception that the upstream switch 108 is virtualized into two virtual switches: virtual switch 202 and virtual switch 204. As a result, the upstream port 112 is divided into two virtual ports: port 206 corresponding to virtual switch 202 and port 208 corresponding to virtual switch 208. Each of the virtual switches 202 and 204, through its respective port 206 and 208, receives ½ of the total bandwidth B from the root complex 106.

Virtual switch 204 is allocated to downstream ports 116, 118, and 120, which are connected to the downstream devices 130, 132, and 134, respectively. Because traffic is balanced across downstream ports 116, 118, and 120, each of the respective downstream devices connected to these downstream ports equally shares the ½ of the total bandwidth B allocated to the virtual switch 204. As a result, the total bandwidth received by each downstream device 130, 132, and 134 is (⅓)*(½), or ⅙ of the total bandwidth B.

Virtual switch 202 is allocated to port 114, which is connected to upstream port 122 of the downstream switch 110. Downstream switch 110 is connected, through its downstream ports 124, 126, and 128, to downstream devices 140, 138, and 136, respectively.

Because the bandwidth received by the downstream switch 110 is balanced across downstream ports 124, 126, and 128, each of the respective downstream devices 140, 138, and 136 connected to these ports equally shares the ½ of the total bandwidth B allocated to the downstream switch 110. As a result, the total bandwidth available for each downstream device 136, 138, and 140, is (⅓)*(½), or ⅙ of the total bandwidth.

In FIG. 2, the same bandwidth was allocated to the downstream devices connected to switch 108 and switch 110. However, depending on the number of downstream devices connected to each switch, each downstream device may not receive the same bandwidth. Nevertheless, the bandwidth allocation across the downstream devices is more equitable when virtual switch partitioning is used relative to a topology that does not use virtual switch partitioning. This is because when virtual switch partitioning is used in a switch, each virtual switch equally shares the total bandwidth. For example, using virtual switch partitioning, a switch with a 16-lane port could be partitioned into two 8-lane ports and a switch with a 32-lane port could be partitioned into two 16-lane ports.

To illustrate this equitable bandwidth distribution when different number of downstream devices are connected to each switch, assume that the downstream switch 110 in FIG. 2 is connected to four downstream devices instead of three. With the upstream switch 108 virtualized, the downstream switch 110 receives ½ of the total bandwidth, which in turn is equally shared by each of the four downstream devices connected to the downstream switch 110 (as described above with reference to FIG. 2). As a result, each of the four downstream devices will receive ⅛ (i.e., (½)*(¼)) of the total bandwidth, while each of the three downstream devices 130, 132, and 134, connected to the upstream switch 108 still receive ⅙ (i.e., (½)*(⅓)) of the total bandwidth (as described above with reference to FIG. 2).

Without virtual switch partitioning, the four downstream devices connected to the downstream switch would equally share ¼ of the total bandwidth (as described above with reference to FIG. 1). As a result, without virtual switch partitioning, the four downstream devices connected to the downstream switch receive 1/16 (i.e., (¼)*(¼)) of the total bandwidth, while each the three downstream devices 130, 132, and 134, connected to the upstream switch 108 would receive ¼ of the total bandwidth. Thus, using virtual switch partitioning, each of the four downstream devices connected to the downstream switch receives twice (⅛ vs. 1/16) the bandwidth they would otherwise receive without virtual switch partitioning, which results in a more equitable distribution of bandwidth across all devices connected to both switches 108 and 110.

Although the above examples describe virtual switch partitioning in a two-switch asymmetrical topology, this virtual switch partitioning may be implemented in various different asymmetrical topologies. For example, this technique may be implemented in asymmetrical topologies where each switch has the same or different number of downstream ports. This technique may also be implemented in asymmetrical topologies in which the same or different number of downstream devices are connected to each switch. Further still, this technique may also be implemented in asymmetrical topologies in which the ports in each switch have the same or different number of lanes.

Figure 3:
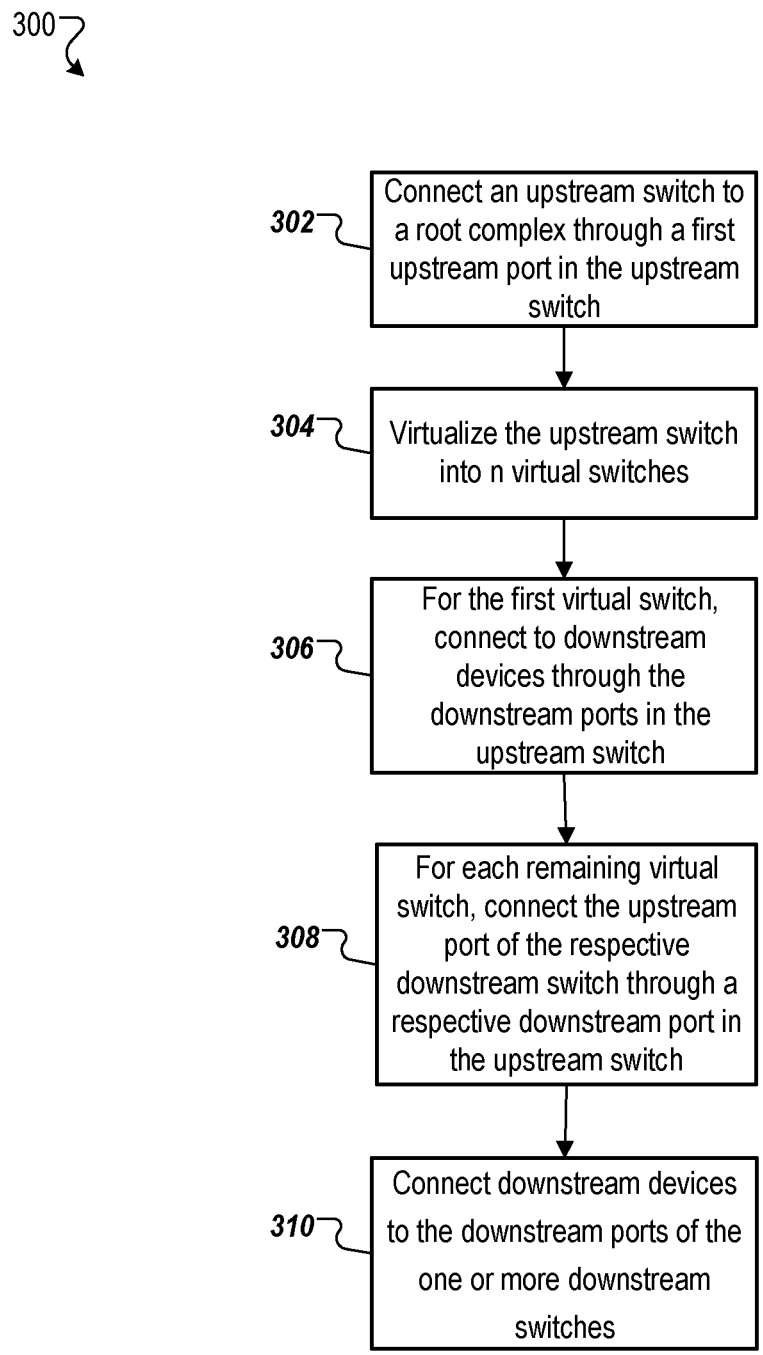
FIG. 3 is a flow diagram of an example process for using virtual switch partitioning in an asymmetrical switch topology.

FIG. 3 is a flow diagram of an example process 300 for using virtual switch partitioning in an asymmetrical switch topology, as shown in FIGS. 1 and 2.

The process 300 connects an upstream switch to a root complex through a first upstream port in the upstream switch (at 302). For example, as shown with reference to FIGS. 1 and 2, the upstream switch 108 is connected to the root complex 106 through the upstream port 112.

The process 300 virtualizes the upstream switch into n virtual switches (at 304). This results in a bandwidth allocation to each virtualized switch B/n of a total bandwidth B. For example, as described with reference to FIG. 2, the upstream switch 108 is virtualized into two virtual switches: virtual switch 202 and virtual switch 204. This results in a bandwidth allocation to each virtualized switch ½ of the total bandwidth B.

The process 300, for the first virtual switch, connects to the downstream devices through the downstream ports in the upstream switch (at 306). For example, as described with reference to FIG. 2, the first virtual switch is connected to downstream devices 130, 132, and 134, through downstream ports 116, 118, and 120, respectively, of the upstream switch 108.

The process 300, for each remaining virtual switch, connects the upstream port of the respective downstream switch through a respective downstream port in the upstream switch (at 308). For example, as described above with reference to FIG. 2, the second virtual switch is allocated to the downstream port 114, which in turn is connected to the upstream port 122 of the downstream switch 110.

The process 300 connects downstream devices to the downstream ports of the one or more downstream switches (at 310). For example, as described above with reference to FIG. 2, downstream devices 136, 138, and 140 are connected to the downstream switch 110 through the respective downstream ports 128, 126, and 124 of the downstream switch 110.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The process and logic flow described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
   an upstream switch connected to a first root complex through a first upstream port that has a bandwidth B, wherein:
   the upstream switch is virtualized into n virtual switches, wherein each of the n virtual switches receives B/n bandwidth from the first upstream port;
   for a first virtual switch of the n virtual switches, the first virtual switch is connected to a first plurality of downstream devices through a first plurality of downstream ports in the upstream switch;
   for each remaining virtual switch of the n virtual switches, the virtual switch is connected to a respective second upstream port of a respective downstream switch, wherein the respective second upstream port of the respective downstream switch is connected to the upstream switch through a respective downstream port in the upstream switch and wherein the respective downstream switch is not connected to a second root complex different from the first root complex; and
   for each respective downstream switch, the downstream switch is connected to a respective second plurality of downstream devices through a respective second plurality of downstream ports in the respective second switch.

2. The system of claim 1, wherein n=2.

3. The system of claim 2, wherein the total number of the first plurality of downstream ports is the same as the total number of the second plurality of downstream ports.

4. The system of claim 1, wherein:
   the first plurality of downstream devices comprises m devices; and
   the respective second plurality of downstream devices comprises p devices, where m is not equal to p.

5. The system of claim 4, wherein:
   each of the m devices receives $B/(n*m)$ bandwidth; and
   each of the p devices receives $B/(n*p)$ bandwidth.

6. The system of claim 1, wherein each of the first upstream port, the first plurality of downstream ports, and the respective second plurality of downstream ports has the same number of lanes.

7. The system of claim 1, wherein each switch is a PCIe switch.

8. A method comprising:
connecting an upstream switch to a first root complex through a first upstream port in the upstream switch;
virtualizing the upstream switch into n virtual switches, wherein each of the n virtual switches receives B/n bandwidth from the first upstream port;
for a first virtual switch of the n virtual switches, connecting a first plurality of downstream devices through a first plurality of downstream ports in the upstream switch;
for each remaining virtual switch of the n virtual switches, connecting a second upstream port of a respective downstream switch to the upstream switch through a respective downstream port in the upstream switch, wherein the respective downstream switch is not connected to a second root complex different from the first root complex; and
for each respective downstream switch, connecting a respective second plurality of downstream devices through a respective second plurality of downstream ports in the at least one respective downstream switch.

9. The method of claim 8, wherein n=2.

10. The method of claim 9, wherein the total number of the first plurality of downstream ports is the same as the total number of the second plurality of downstream ports.

11. The method of claim 8, wherein:
the first plurality of downstream devices comprises m devices; and
the respective second plurality of downstream devices comprises p devices, where m is not equal to p.

12. The method of claim 11, wherein:
each of the m devices receives B/(n*m) bandwidth from the first upstream port; and
each of the p devices receives B/(n*p) bandwidth from the first upstream port.

13. The method of claim 8, wherein each of the first upstream port, the first plurality of downstream ports, and the respective second plurality of downstream ports has the same number of lanes.

14. The method of claim 13, wherein each switch is a PCIe switch.

* * * * *